US012507011B2

(12) United States Patent
Lowe et al.

(10) Patent No.: US 12,507,011 B2
(45) Date of Patent: Dec. 23, 2025

(54) STEREO HEADPHONE PSYCHOACOUSTIC SOUND LOCALIZATION SYSTEM AND METHOD FOR RECONSTRUCTING STEREO PSYCHOACOUSTIC SOUND SIGNALS USING SAME

(71) Applicant: LISN TECHNOLOGIES INC., Calgary (CA)

(72) Inventors: Danny Dayce Lowe, Calgary (CA); William Bradford Steckel, Calgary (CA); Timothy James William Pike, Calgary (CA); Jeffrey James Bottriell, Calgary (CA)

(73) Assignee: LISN TECHNOLOGIES INC., Calgary (CA)

( * ) Notice: Subject to any disclaimer, the term of this patent is extended or adjusted under 35 U.S.C. 154(b) by 375 days.

(21) Appl. No.: 18/268,106

(22) PCT Filed: Dec. 16, 2021

(86) PCT No.: PCT/CA2021/051818
§ 371 (c)(1),
(2) Date: Jun. 16, 2023

(87) PCT Pub. No.: WO2022/126271
PCT Pub. Date: Jun. 23, 2022

(65) Prior Publication Data

US 2024/0056735 A1 Feb. 15, 2024

Related U.S. Application Data

(60) Provisional application No. 63/126,490, filed on Dec. 16, 2020.

(51) Int. Cl.
*H04R 5/04* (2006.01)
*H04R 5/033* (2006.01)
*H04S 7/00* (2006.01)

(52) U.S. Cl.
CPC ............... *H04R 5/04* (2013.01); *H04R 5/033* (2013.01); *H04S 7/30* (2013.01)

(58) Field of Classification Search
None
See application file for complete search history.

(56) References Cited

U.S. PATENT DOCUMENTS 4,817,149 A * 3/1989 Myers ..................... H04S 7/302 381/74
5,371,799 A 12/1994 Kobayashi
(Continued)

FOREIGN PATENT DOCUMENTS

WO 2015035492 A1 3/2015

OTHER PUBLICATIONS

International Search Report of PCT/CA2021/051818.
(Continued)

*Primary Examiner* — Paul W Huber

(57) ABSTRACT

A sound-processing apparatus for processing a sound-bearing signal. The apparatus has a signal decomposition module for separating the sound-bearing signal into a plurality of signal components comprising a plurality of perceptual feature components, a spectrum modification module and a phase adjustment module for modifying the spectrum and time delay of each of the plurality of signal components, a psychoacoustical signal processing module having a plurality of psychoacoustic filters for filtering the plurality of signal components into a group of left (L) signals and a group of right (L) signals which are combined for outputting a L output signal and a R output signal for sound generation.

22 Claims, 7 Drawing Sheets

(56) References Cited

U.S. PATENT DOCUMENTS

| | | | | |
|---|---|---|---|---|
| 5,742,689 | A * | 4/1998 | Tucker | H04S 7/30 381/17 |
| 9,215,544 | B2 * | 12/2015 | Faure | H04S 1/00 |
| 10,750,278 | B2 * | 8/2020 | Yang | H04S 1/00 |
| 11,503,419 | B2 * | 11/2022 | Mor | H04S 3/00 |
| 12,142,284 | B2 * | 11/2024 | Disch | G10L 25/21 |
| 2005/0265558 | A1 * | 12/2005 | Neoran | H04S 1/002 381/63 |
| 2015/0117685 | A1 | 4/2015 | Reiss et al. | |

OTHER PUBLICATIONS

Written Opinion of PCT/CA2021/051818.
Alexandre Defossez et al., "Music Source Separation in the Waveform Domain", Nov. 27, 2019, pp. 1-15.

* cited by examiner

STEREO HEADPHONE PSYCHOACOUSTIC SOUND LOCALIZATION SYSTEM AND METHOD FOR RECONSTRUCTING STEREO PSYCHOACOUSTIC SOUND SIGNALS USING SAME

CROSS-REFERENCE TO RELATED APPLICATIONS

This Application is a national stage application of PCT/CA2021/051818. This application claims the benefit of PCT Application No. PCT/CA2021/051818, filed Dec. 16, 2021, and U.S. Provisional Patent Application Ser. No. 63/126,490, filed Dec. 16, 2020, the content of which are incorporated herein by reference in its entirety.

TECHNICAL FIELD

The present disclosure relates generally to a headphone sound system and a method for reconstructing stereo psychoacoustic sound signals, and in particular to a stereo-headphone psychoacoustic sound localization system and a method for reconstructing a stereo psychoacoustic sound signals using same. More particularly, the system and method are designed to utilize conventional stereo or binaural input signals as well as the insertion of additional discrete sound sources when desirable for movie sound tracks, music, video games, and other audio products.

BACKGROUND

Sound systems using stereo headphones are known, and have been widely used in personal audio-visual entertainments such as listening to music or broadcast, playing video games, watching movies, and the like.

A sound system with headphones generally comprises a signal generation module generating audio-bearing signals (for example, electrical signals bearing the information of the audio signals) from a source such as an audio file, an audio mixer mixing a plurality of audio clips as needed or as desired (for example, an audio output of a gaming device), radio signals (for example, frequency modulation (FM) broadcast signals), streaming, and/or the like. The audio-bearing signals generated by the signal generation module are often processed by a signal processing module (for example, noise mitigation, equalization, echo adjustment, timescale-pitch modification, and/or the like), and then sent to headphones (for example, a headset, earphones, earbuds, or the like) via suitable wired or wireless means. The headphones generally comprise a pair of speakers positioned in or about a user's ears for converting the audio-bearing signals to audio signals for the user to listen. The headphones may also comprise one or more amplifiers for amplifying the audio-bearing signals before sending the audio-bearing signals to the speakers.

Although many headphones provide very good fidelity in reproducing common stereo, they do not deliver the same level of sound experience as modern loudspeaker systems such as surround sound systems utilizing multiple speakers found in typical home or commercial theater environments. Applying the same signal processing technologies used in the loudspeaker systems to systems with headphones also has various defects. For example, the "virtual" sound sources (i.e., the sound sources the listener feels) are limited to the left ear, right ear, or anywhere therebetween, thereby creating a "sound image" with limited psychoacoustic effects residing in the listener's head.

Such an issue may be due to the manner in which the human brain interprets the different times of arrival and different frequency-based amplitudes of audio signals at the respective ears of the listener including reflections generated within a listening environment.

US Patent Application Publication No. 2019/0230438 A1 to Hatab, et al. teaches a method for processing audio data for output to a transducer. The method may include receiving an audio signal, filtering the audio signal with a fixed filter having fixed filter coefficients to generate a filtered audio signal, and outputting the filtered audio signal to the transducer. The fixed filter coefficients of the fixed filter may be tuned by using a psychoacoustic model of the transducer to determine audibility masking thresholds for a plurality of frequency sub-bands, allocating compensation coefficients to the plurality of frequency sub-bands, and fitting the fixed filter coefficients with the compensation coefficients allocated to the plurality of sub-bands.

US Patent Application Publication No. 2020/0304929 A1 to Böhmer teaches a stereo unfold technology for solving the inherent problems in the stereo reproduction by utilizing modern DSP technology to extract information from the Left (L) and Right (R) stereo channels to create a number of new channels that feeds into processing algorithms. The stereo unfold technology operates by sending the ordinary stereo information in the customary way towards the listener to establish the perceived location of performers in the sound field with great accuracy and then projects delayed and frequency shaped extracted signals forward as well as in other directions to provide additional psychoacoustically based clues to the ear and brain. The additional clues generate the sensation of increased detail and transparency as well as establishing the three dimensional properties of the sound sources and the acoustic environment in which they are performing. The stereo unfold technology manages to create a real believable three-dimensional soundstage populated with three-dimensional sound sources generating sound in a continuous real sounding acoustic environment.

US Patent Application Publication No. 2017/0265786 A1 to Fereczkowski, et al. teaches a method of determining a psychoacoustical threshold curve by selectively varying a first parameter and a second parameter of an auditory stimulus signal applied to a test subject/listener. The methodology comprises steps of determining a two-dimensional boundary region surrounding an a priori estimated placement of the psychoacoustical threshold curve to form a predetermined two-dimensional response space comprising a positive response region at a first side of the a priori estimated psychoacoustical threshold curve and a negative response region at a second and opposite side of the a priori estimated psychoacoustical threshold curve. A series of auditory stimulus signals in accordance with the respective parameter pairs are presented to the listener through a sound reproduction device and the listener's detection of a predetermined attribute/feature of the auditory stimulus signals is recorded such that a stimuli path through the predetermined two-dimensional response space is traversed. The psychoacoustical threshold curve is computed based on at least a subset of the recorded parameter pairs.

U.S. Pat. No. 9,807,502 B1 to Hatab, et al. teaches psychoacoustic models that may be applied to audio signals being reproduced by an audio speaker to reduce input signal energy applied to the audio transducer. Using the psychoacoustic model, the input signal energy may be reduced in a manner that has little or no discernible effect on the quality of the audio being reproduced by the transducer. The psychoacoustic model selects energy to be reduced from the audio signal based, in part, on human auditory perceptions and/or speaker reproduction capability. The modification of energy levels in audio signals may be used to provide speaker protection functionality. For example, modified audio signals produced through the allocation of compensation coefficients may reduce excursion and displacement in a speaker; control temperature in a speaker; and/or reduce power in a speaker.

Therefore, it is always a desire for a system that may provide an apparent or virtual sound location outside of the listener's head as well as panning through the inside of the user's head. Moreover, a system in which the apparent sound source may be made to move, preferably at the instigation of the user, would also be desirable.

SUMMARY

According to one aspect of this disclosure, there is provided a sound-processing apparatus for processing a sound-bearing signal, the apparatus comprising: a signal decomposition module for separating the sound-bearing signal into a plurality of signal components, the plurality of signal components comprising a left signal component, a right signal component, and a plurality of perceptual feature components; and a psychoacoustical signal processing module comprising a plurality of psychoacoustic filters for filtering the plurality of signal components into a group of left (L) filtered signals and a group of right (R) filtered signals, and outputting a combination of the group of L filtered signals as a left output signal and a combination of the group of R filtered signals as a right output signal.

In some embodiments, each of the plurality of psychoacoustic filters is a modified psychoacoustical impulse response (MPIR) filter modified from an impulse response obtained in a real-world environment.

In some embodiments, the coefficients of the plurality of psychoacoustic filters are stored in a non-transitory storage.

In some embodiments, the plurality of signal components further comprises a mono signal component.

In some embodiments, the plurality of perceptual feature components comprise a plurality of stem signal components.

In some embodiments, the left output signal is the summation of the group of L filtered signals and the right output signal is the summation of the group of R filtered signals.

In some embodiments, the plurality of psychoacoustic filters are grouped into a plurality of filter banks; each filter bank comprises one or more filter pairs; each filter pair comprises two psychoacoustic filters of the plurality of psychoacoustic filters; and each of the plurality of filter banks is configured for receiving a respective one of the plurality of signal components for passing through the psychoacoustic filters thereof and generating a subset of the group of L filtered signals and a subset of the group of R filtered signals.

In some embodiments, the sound-processing apparatus further comprises: a spectrum modification module for modifying a spectrum of each of the plurality of signal components.

In some embodiments, the sound-processing apparatus further comprises: a time-delay module for modifying a relative time delay of one or more of the plurality of signal components.

In some embodiments, the one or more of perceptual feature components comprise a plurality of discrete feature components determined based on non-directional and non-frequency sound characteristics.

In some embodiments, the signal decomposition module comprises a prediction submodule for generating the plurality of perceptual feature components from the sound-bearing signal.

In some embodiments, the signal decomposition module comprises a prediction submodule; the prediction submodule comprises or is configured to use an artificial intelligence (AI) model for generating the plurality of perceptual feature components from the sound-bearing signal.

In some embodiments, the AI model comprises a machine-learning model.

In some embodiments, the AI model comprises neural network.

In some embodiments, the neural network comprises an encoder-decoder convolutional neural network.

In some embodiments, the neural network comprises a U-Net encoder/decoder convolutional neural network.

In some embodiments, the signal decomposition module further comprises a signal preprocess submodule and a signal post-processing submodule; the signal preprocess submodule is configured for calculating a short-time Fourier transform (STFT) of the sound-bearing signal as a complex spectrum (CS) thereof for the prediction submodule to generate the plurality of perceptual feature components; the prediction submodule is configured for generating a time-frequency mask; and the signal post-processing submodule is configured for generating the plurality of perceptual feature components by computing the inverse fast Fourier transform (IFFT) of the product of the soft mask and the CS of the sound-bearing signal.

In some embodiments, the plurality of psychoacoustic filters are configured for changing at least one of a perceived location of the sound-bearing signal, a perceived ambience of the sound-bearing signal, a perceived dynamic range of the sound-bearing signal, and a perceived spectral emphasis of the sound-bearing signal.

In some embodiments, the sound-processing apparatus is configured for processing a sound-bearing signal and outputting the left and right output signals in real-time.

In some embodiments, at least a subset of the plurality of psychoacoustic filters are configured for operating in parallel.

According to one aspect of this disclosure, there is provided a method for processing a sound-bearing signal, the method comprising: separating the sound-bearing signal into a plurality of signal components comprising a left signal component, a right signal component, and a plurality of perceptual feature components; using a plurality of psychoacoustic filters to filter the plurality of signal components into a group of left (L) filtered signals and a group of right (R) filtered signals; and outputting a combination of the group of L filtered signals as a left output signal and a combination of the group of R filtered signals as a right output signal.

In some embodiments, each of the plurality of psychoacoustic filters is a modified psychoacoustical impulse response (MPIR) filter modified from an impulse response obtained in a real-world environment.

In some embodiments, the coefficients of the plurality of psychoacoustic filters are stored in a non-transitory storage.

In some embodiments, the plurality of signal components further comprises a mono signal component.

In some embodiments, the plurality of perceptual feature components comprise a plurality of stem signal components.

In some embodiments, the left output signal is the summation of the group of L filtered signals and the right output signal is the summation of the group of R filtered signals.

In some embodiments, said filtering the plurality of signal components into the group of L filtered signals and the group of R filtered signals comprising: passing each of the plurality of signal components through a respective first subset of the plurality of psychoacoustic filters in parallel for generating a subset of the group of L filtered signals; and passing each of the plurality of signal components through a respective second subset of the plurality of psychoacoustic filters in parallel for generating a subset of the group of R filtered signals.

In some embodiments, the method further comprises: modifying a spectrum of each of the plurality of signal components.

In some embodiments, the method further comprises: modifying a relative time delay of one or more of the plurality of signal components.

In some embodiments, the one or more of perceptual feature components comprise a plurality of discrete feature components determined based on non-directional and non-frequency sound characteristics.

In some embodiments, said separating the sound-bearing signal comprises: using a neural network for generating the plurality of perceptual feature components from the sound-bearing signal.

In some embodiments, the neural network comprises an encoder-decoder convolutional neural network.

In some embodiments, the neural network comprises a U-Net encoder/decoder convolutional neural network.

In some embodiments, said separating the sound-bearing signal comprises: calculating a short-time Fourier transform (STFT) of the sound-bearing signal as a complex spectrum (CS) thereof; generating a time-frequency mask; and generating the plurality of perceptual feature components by computing the inverse fast Fourier transform (IFFT) of the product of the soft mask and the CS of the sound-bearing signal.

In some embodiments, said using the plurality of psychoacoustic filters to filter the plurality of signal components comprises: using the plurality of psychoacoustic filters for changing at least one of a perceived location of the sound-bearing signal, a perceived ambience of the sound-bearing signal, a perceived dynamic range of the sound-bearing signal, and a perceived spectral emphasis of the sound-bearing signal.

In some embodiments, said separating the sound-bearing signal comprises: separating the sound-bearing signal into the plurality of signal components in real-time; said using the plurality of psychoacoustic filters to filter the plurality of signal components comprises: using the plurality of psychoacoustic filters to filter the plurality of signal components into the group of L filtered signals and the group of R filtered signals in real-time; and said outputting the combination of the group of L filtered signals as the left output signal and the combination of the group of R filtered signals as the right output signal comprises: outputting the combination of the group of L filtered signals as the left output signal and the combination of the group of R filtered signals as the right output signal in real-time.

In some embodiments, at least a subset of the plurality of psychoacoustic filters are configured for operating in parallel.

According to one aspect of this disclosure, there is provided one or more non-transitory computer-readable storage devices comprising computer-executable instructions for processing a sound-bearing signal, wherein the instructions, when executed, cause a processing structure to perform actions comprising: separating the sound-bearing signal into a plurality of signal components comprising a left signal component, a right signal component, and a plurality of perceptual feature components; using a plurality of psychoacoustic filters to filter the plurality of signal components into a group of left (L) filtered signals and a group of right (R) filtered signals; and outputting a combination of the group of L filtered signals as a left output signal and a combination of the group of R filtered signals as a right output signal.

In some embodiments, each of the plurality of psychoacoustic filters is a modified psychoacoustical impulse response (MPIR) filter modified from an impulse response obtained in a real-world environment.

In some embodiments, wherein the coefficients of the plurality of psychoacoustic filters are stored in a non-transitory storage.

In some embodiments, the plurality of signal components further comprises a mono signal component.

In some embodiments, the plurality of perceptual feature components comprise a plurality of stem signal components.

In some embodiments, the left output signal is the summation of the group of L filtered signals and the right output signal is the summation of the group of R filtered signals.

In some embodiments, said filtering the plurality of signal components into the group of L filtered signals and the group of R filtered signals comprising: passing each of the plurality of signal components through a respective first subset of the plurality of psychoacoustic filters in parallel for generating a subset of the group of L filtered signals; and passing each of the plurality of signal components through a respective second subset of the plurality of psychoacoustic filters in parallel for generating a subset of the group of R filtered signals.

In some embodiments, the instructions, when executed, cause the processing structure to perform further actions comprising: modifying a spectrum of each of the plurality of signal components.

In some embodiments, the instructions, when executed, cause the processing structure to perform further actions comprising: modifying a relative time delay of one or more of the plurality of signal components.

In some embodiments, the one or more of perceptual feature components comprise a plurality of discrete feature components determined based on non-directional and non-frequency sound characteristics.

In some embodiments, said separating the sound-bearing signal comprises: using a neural network for generating the plurality of perceptual feature components from the sound-bearing signal.

In some embodiments, the neural network comprises an encoder-decoder convolutional neural network.

In some embodiments, the neural network comprises a U-Net encoder/decoder convolutional neural network.

In some embodiments, said separating the sound-bearing signal comprises: calculating a short-time Fourier transform (STFT) of the sound-bearing signal as a complex spectrum (CS) thereof; generating a time-frequency mask; and generating the plurality of perceptual feature components by computing the inverse fast Fourier transform (IFFT) of the product of the soft mask and the CS of the sound-bearing signal.

In some embodiments, said using the plurality of psychoacoustic filters to filter the plurality of signal components comprises: using the plurality of psychoacoustic filters for changing at least one of a perceived location of the sound-bearing signal, a perceived ambience of the sound-bearing signal, a perceived dynamic range of the sound-bearing signal, and a perceived spectral emphasis of the sound-bearing signal.

In some embodiments, said separating the sound-bearing signal comprises: separating the sound-bearing signal into the plurality of signal components in real-time; said using the plurality of psychoacoustic filters to filter the plurality of signal components comprises: using the plurality of psychoacoustic filters to filter the plurality of signal components into the group of L filtered signals and the group of R filtered signals in real-time; and said outputting the combination of the group of L filtered signals as the left output signal and the combination of the group of R filtered signals as the right output signal comprises: outputting the combination of the group of L filtered signals as the left output signal and the combination of the group of R filtered signals as the right output signal in real-time.

In some embodiments, at least a subset of the plurality of psychoacoustic filters are configured for operating in parallel.

DETAILED DESCRIPTION

System Overview

Figure 1:
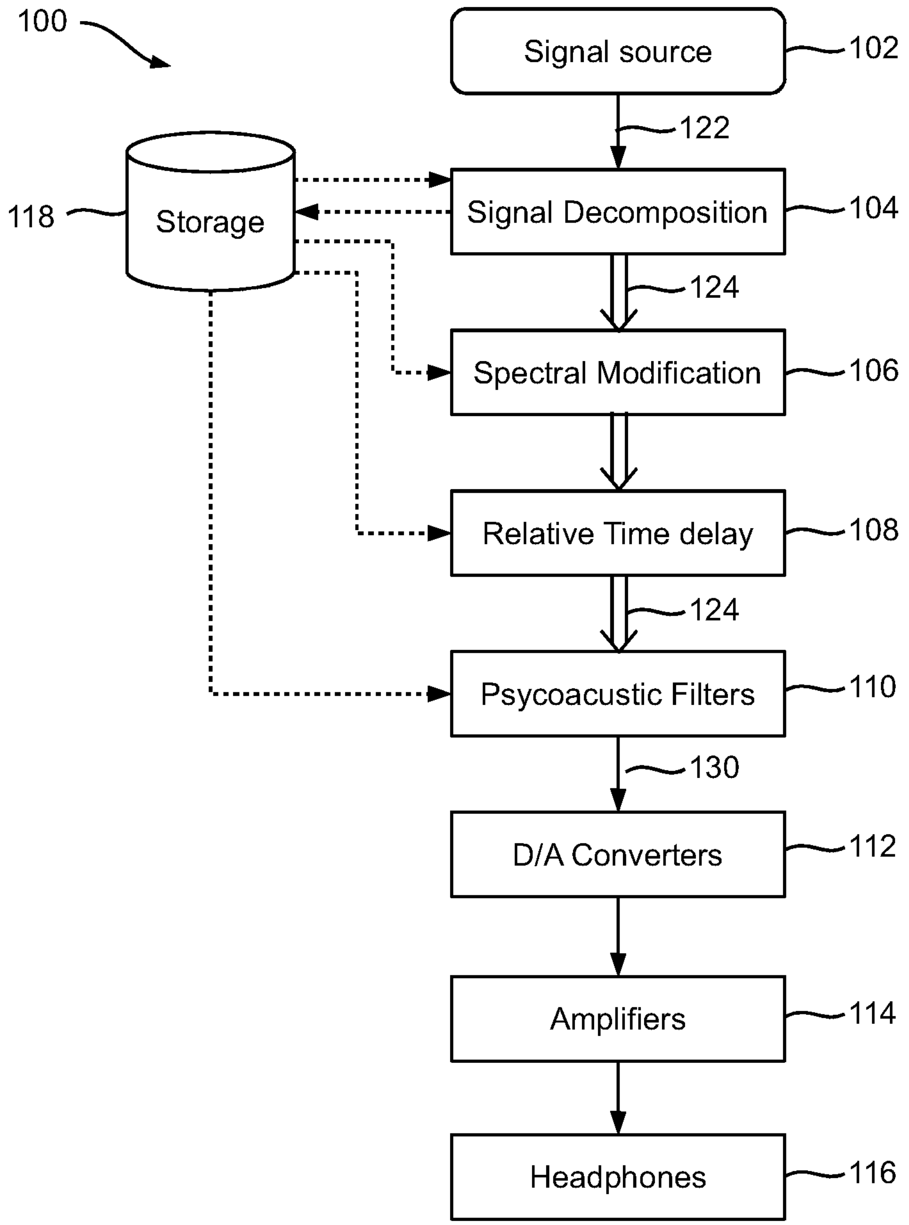
FIG. 1 is a schematic diagram of an audio system, according to some embodiments of this disclosure.

Embodiments disclosed herein generally relate to sound processing systems, apparatuses, and methods for reproducing audio signals over headphones. The sound processing systems, apparatuses, and methods disclosed herein are configured for reproducing sounds via headphones in a manner appearing to the listener to be emanating from sources inside and/or outside of the listener's head and also allowing such apparent sound locations to be changed by the listener or user. The sound processing systems, apparatuses, and methods disclosed herein are designed to utilize conventional stereo or binaural input signals as well as the insertion of additional discrete sound sources when desirable for movie sound tracks, music, video games, and other audio products.

According to one aspect of this disclosure, the systems, apparatuses, and methods disclosed herein may manipulation and modify a stereo or binaural audio signal for producing a psychoacoustically modified binaural signal which, when reproduced through headphones, may provide the listener the perception that the sounds is produced or originated in the listener's psychoacoustic environment outside the listener's head. Herein, the psychoacoustic environment comprises one or more virtual positions, each represented in a matrix of psychoacoustic impulse responses.

In some embodiments, the systems, apparatuses, and methods disclosed herein may also process other audio signals such as additionally injected input audio signals (for example, additional sounds dynamically occurred or introduced to enhance a sound environment in some applications such as gaming or some applications using filters in sound production), deconstructed discrete signals in addition to what is found as part of or discretely accessible in an original commercial stereo or binaural recording (such as mono (M) signal, left-channel (L) signal, right-channel (R) signal, surrounding signals, and/or the like), and/or the like for use as an enhancement for producing the psychoacoustically modified binaural signal.

In some embodiments, the system, apparatus, and method disclosed herein may process a stereo or binaural audio signal for playback over wired and/or wireless headphones in which the processed audio signal may appear to the listener to be emanating from apparent sound locations of one or more "virtual" sound sources outside of the listener's head and, if desirable, one or more sound sources inside the listener's head.

In some embodiments, the apparent sound locations may be changed such that the virtual sound sources may travel from one location to another as if panning from one environment to another. The systems, apparatuses, and methods disclosed herein process the input signal by using a set of modified psychoacoustical impulse response (MPIR) filters determined from a series of psychoacoustical impulses expressed in multiple direct-wave and geometric based reflections.

The system or apparatus processes conventional stereo input signals by convolving them with the set of MPIR filters and in certain cases inserted discrete signals (i.e., separate or distinct input audio signals additionally injected into conventional stereo input signals) thereby providing an open-air-like surround sound experience similar to that of a modern movie theater or home theater listening experience when listening over headphones. The process employs multiple MPIR filters derived from various geometries within a given environment such as but not limited to trapezium, convex, and concave polygon quadrilateral geometries summed to produce left and right headphone signals for playback over the respective headphone transducers. The benefit of using multiple geometries allows the apparatus to emulate what is found in live or open air listening environments. Each geometry provides acoustic influence on how a sound element is heard. An example utilizing 3 geometries and the subsequent filter is as follows:

An instrument when played in a live environment has at least three distinct acoustical elements:

1. Mostly direct sound waves relative to the proximity of an instrument are usually captured between 10 centimeters and one (1) meter from the instrument.
2. The performance (stage) area containing additional ambient reflections is usually capture within two (2) to five (5) meters from the instrument and in combination with other instruments or vocal elements from the performance area.
3. The ambiance of the listening room is usually where an audience would be seated includes all other sound sources such as additional instruments and or voices found in a symphony orchestra and or choir as an example. This environment has very complex multiple reflections usually at a distance of five (5) meters to several hundred meters from the performance area as found in large concert hall or arena. This may also be a small-room listening area such as a night club or small venue theater environment.

The system, apparatus, and method disclosed herein may be used with conventional stereo files with optional insertion of additional discrete sounds where applicable for music, movies, video files, video games, communication systems, augmented reality, and/or the like.

System Structure

Turning now to FIG. 1, an audio system according to some embodiments of this disclosure is shown and is generally identified using reference numeral 100. In various embodiments, the audio system 100 may be in the form of a headphone apparatus (for example, headphones, a headset, earphones, earbuds, or the like) with all components described below integrated therein, or may comprise a signal processing apparatus separated from but functionally coupled to a headphone apparatus such as conventional headphones, headset, earphones, earbuds, and/or the like.

As shown in FIG. 1, the audio system 100 comprises a signal decomposition module 104 for receiving an audio-bearing signal 122 from a signal source 102, a spectrum modification module 106, a time-delay module 108, a psychoacoustical signal processing module 110 having a plurality of psychoacoustical filters, a digital-to-analog (D/A) converter module 112 having a (multi-channel) D/A converter, an amplification module 114 having a (multi-channel) amplifier, and a speaker module 116 having a pair of transducers 116 such as a pair of speakers suitable for positioning about or in a user's ears for playing audio information thereto. The audio system 100 also comprises a non-transitory storage 118 functionally coupled to one or more of the signal decomposition module 104, the spectrum modification module 106, the time-delay module 108, and the psychoacoustical signal processing module 110 for storing intermediate or final processing results and for storing other data as needed.

The signal source 102 may be any suitable audio-bearing signal source such as an audio file, a music generator (for example, a Musical Instrument Digital Interface (MIDI) device), an audio mixer mixing a plurality of audio clips as needed or as desired (for example, an audio output of a gaming device), an audio recorder, radio signals (for example, frequency modulation (FM) broadcast signals), streamed audio signals, audio components of audio/video streams, audio components of movies, audio components of video games, and/or the like.

The audio-bearing signal 122 may be a signal bearing the audio information and is in a form suitable for processing. For example, the audio-bearing signal 122 may be an electrical signal, an optical signal, and/or the like which represents, encodes, or otherwise comprises audio information. In some embodiments, the audio-bearing signal 122 may be a digital signal (for example, a signal in the discrete-time domain with digitized amplitudes). However, those skilled in the art will appreciate that, in some alternative embodiments, the audio-bearing signal 122 may be an analog signal (for example, a signal in the continuous-time domain with undigitized or analog amplitudes) which may be converted to a digital signal via one or more analog-to-digital (A/D) converters. For ease of description, the audio-bearing signal 122 may be simply denoted as an "audio signal" or simply a "signal" hereinafter, while the signals output from the speaker module 116 may be denoted as "acoustic signals" or "sound".

In some embodiments, the audio signal 122 may be a conventional stereo or binaural signal having a plurality of signal channels, each channel is represented by a series of real numbers.

As shown in FIG. 1, the signal decomposition module 104 receives the audio signal 122 from the signal source 102 and decomposes or otherwise separates the audio signal 122 into a plurality of decomposed signal components 124.

Each of the decomposed signal components 124 is output from the signal decomposition module 104 to the spectrum modification module 106 and the time-delay module 108 for spectrum modification such as spectrum equalization, spectrum shaping, and/or the like, and for relative time delay modification or adjustment as needed.

More specifically, the spectrum modification module 106 may comprise a plurality of, for example, cut filters (for example, low-cut (that is, high-pass) filters, high-cut (that is, low-pass) filters, and/or band-cut (that is, band-pass) filters), for modifying the decomposed signal components 124. In some embodiments, the spectrum modification module 106 may be configured to use a global equalization curve for modifying the decomposed signal components 124. In some other embodiments, the spectrum modification module 106 may be configured to use a plurality of equalization curves for independent modification of each of the decomposed signal components 124 to adapt to the desired environments.

As those skilled in the art will appreciate, variances in the phase of an audio signal may aid in the perception to the listener that the sound has originated from outside their headphones. Therefore, the signals output from the spectrum modification module 106 are processed by the time-delay module 108 for manipulation of the interaural time difference (ITD) thereof, which is the difference in time of arrival between two ears. The ITD is an important aspect of sound positioning in humans as it provides a cue to the direction and angle of a sound in relation to the listener. In some embodiments, other time-delay adjustments may also be performed as needed or desired. As those skilled in the art will appreciate, time-delay adjustments may affect the listener's perception of loudness or position of a particular sound within the generated output signal when mixed.

As those skilled in the art will appreciate, each MPIR filter (described in more detail later) of a given psychoacoustic environment may be associated with one or more specific phase-correction values (chosen by what the phase is changed in relation thereto). Such phase-correction values may be used by the time-delay module 108 for introducing time delays to its input signal in relation to other sound sources within an environment, in relation to the input of its pair, or in relation to the MPIR filters' output signals.

As those skilled the art will also appreciate, the phase values of the MPIR filter may be represented by an angle ranging from 0 to 360 degrees. For MPIR filters with a phase-correction value greater than 0, the time-delay module 108 may modify the signal to be inputted to the respective MPIR filter as configured. In some embodiments, the time-delay module 108 may modify or shift the phase of the signal by signal-padding (i.e., adding zeros to the end of the signal) or by using an all-pass filter. The all-pass filter passes all frequencies equally in gain but changes the phase relationship among various frequencies.

Referring again to FIG. 1, the spectrum and time-delay modified signal components 124 are then sent to the psychoacoustical signal processing module 110 for introducing a psychoacoustic environment effect thereto (such as adding virtual position, ambience and elemental amplitude expansion, spectral emphasis, and/or the like) and forming a pair of output signals 130 (such as a left-channel (L) output signal and a right-channel (R) output signal). Then, the pair of output signals 130 are converted to the analog form via the D/A converter module 112, amplified by the amplifier module 114, and sent to the speaker module 116 for sound generation.

Figure 2:
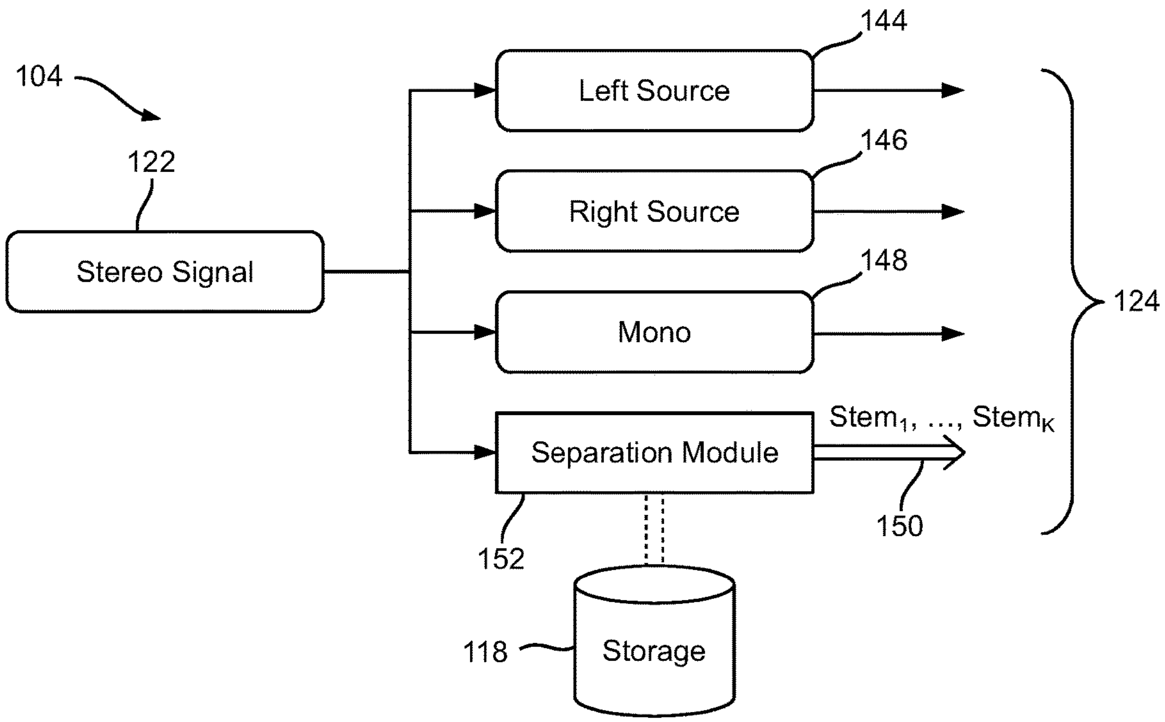
FIG. 2 is a schematic diagram showing a signal-decomposition module of the audio system shown in FIG. 1.

As shown in FIG. 2, the signal decomposition module 104 decomposes the audio signal 122 into a plurality of decomposed signal components 124 including a L signal component 144, a R signal component 146, and a mono (M) signal component 148 (which is used for constructing a psychoacoustical effect of direct front or direct back of the listener). The signal decomposition module 104 also passes the audio signal 122 through a signal-separation submodule 152 to decompose the audio signal 122 into a plurality of discrete, perceptual feature components 150. The L, R, M, and perceptual feature components 144 to 150 are output to the spectrum modification module 106 and the time-delay module 108. The perceptual feature components 150 are also stored in the storage 118.

Herein, the perceptual feature components 150 represent sound components of various characteristics (for example, natures, effects, instruments, sound sources, and/or the like) such as sounds of vocals, voices, instruments (for example, piano, violin, guitar, and the like), background music, explosions, gunshots, and other special sound effects (collectively denoted as named discrete features).

In these embodiments, the perceptual feature components 150 comprise K stem signal components $\text{Stem}_1, \ldots, \text{Stem}_k$, wherein a stem signal component 150 is a discrete signal component or a grouped collection of mixed audio signal components being in part composed from and/or forming a final sound composition. A stem signal component in a musical context may be, for example, all string instruments in a composition, all instruments, or just the vocals. A stem signal component 150 may also be, for example, different types of sounds such as vehicle horns, sound of explosions, sound of gunshots, and/or the like in a game. Stereo audio signals are often composed of multiple distinct acoustic sources mixed together to create a final composition. Therefore, separation of the stem signal components 150 allows these distinct signals to be separately directed through various downstream modules 106 to 110 for processing.

In various embodiments, such decomposition of stem signal components 150 may be different to and/or in addition to the conventional directional signal decomposition (for example, left channel and right channel) or frequency-based decomposition (for example, frequency band separation in conventional equalizers) and may be based on non-directional and non-frequency-based characteristics of the sounds such as non-directional, non-frequency-based, perceptual characteristics of the sounds.

Figure 3A:
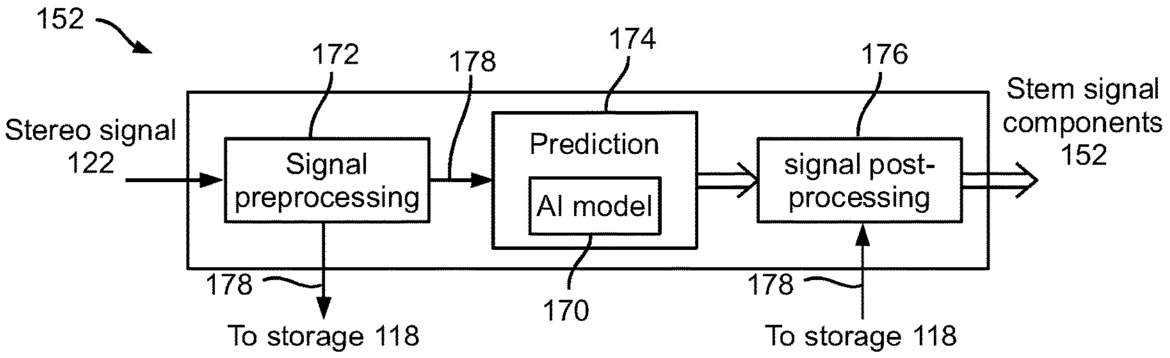
FIG. 3A is a schematic diagram showing a signal-separation submodule of the signal-decomposition module shown in FIG. 2.

As shown in FIG. 3A, in these embodiments, the signal-separation submodule 152 separates the audio signal 122 into stem signal components 150 by utilizing an artificial intelligence (AI) model 170 such as a machine learning model to predict and apply a time-frequency mask or soft mask. The signal-separation submodule 152 comprises a signal preprocessing submodule 172, a prediction submodule 174, and a signal post-processing submodule 176 cascaded in sequence. The input to the signal-separation submodule 152 is supplied as a real valued signal and is first processed by the signal preprocessing submodule 172. The prediction submodule 174 in these embodiments comprises a neural network 170 which is used for individually separating each stem signal component (that is, the neural network 170 may be used for K times for individually separating the K stem signal components).

The preprocess submodule 172 receives the audio signal 122 and calculates the short-time Fourier transform (STFT) thereof to obtain the complex spectrum thereof, which is then used to obtain a real-value magnitude spectrum 178 of the audio signal 122 which is stored in the storage 118 for its later use by the post-processing submodule 174. The magnitude spectrum 178 is fed to the prediction submodule 174 for separating each stem signal component 150 from the audio signal 122.

The prediction submodule 174 may comprise or use any suitable neural network. For example, in these embodiments, the prediction submodule 174 comprises or uses an encoder-decoder convolutional neural network (CNN) 170 such as U-Net encoder-decoder CNN, the detail of which is described in the academic paper "Spleeter: a fast and efficient music source separation tool with pre-trained models," by Hennequin, Romain, et al., published on Journal of Open Source Software, vol. 5, no. 50, 2020, p. 2154, and accessible at https://joss.theoj.org/papers/10.21105/joss.02154.

Figure 3B:
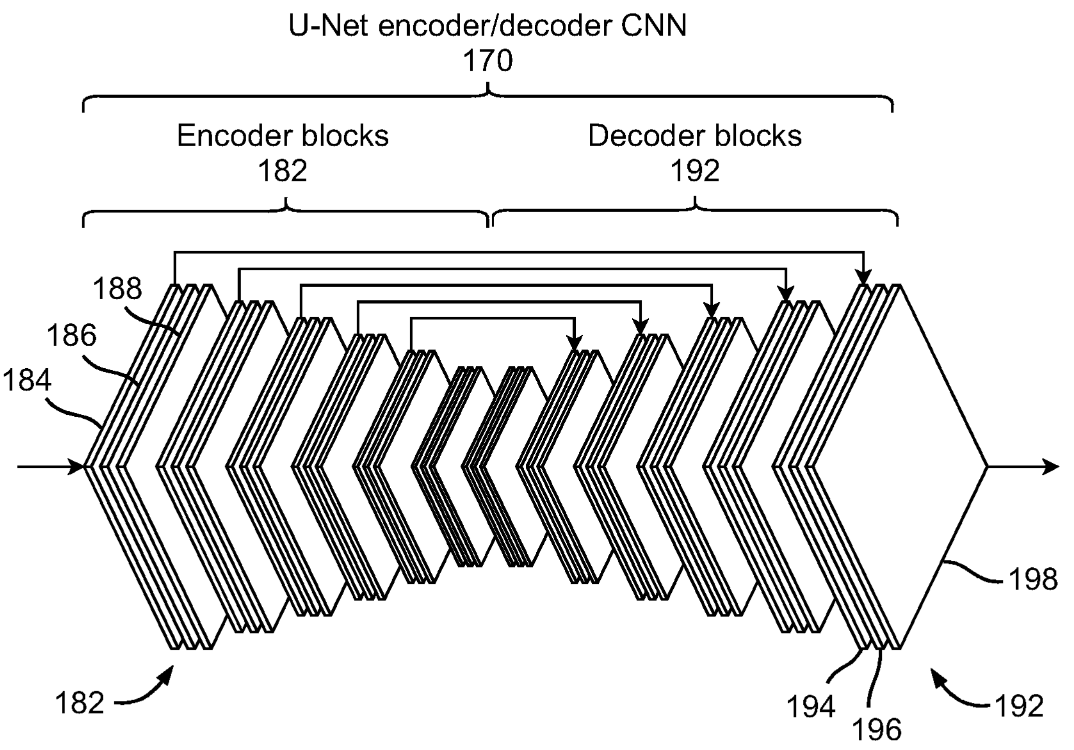
FIG. 3B is a schematic diagram showing a U-Net encoder/decoder convolutional neural network (CNN) of a prediction submodule of the signal-separation submodule shown in FIG. 3A.

As shown in FIG. 3B, the U-Net encoder/decoder CNN 170 comprises 12 blocks with six (6) blocks 182 for encoding and another six (6) blocks 192 for decoding. Each encoding block comprises a convolutional layer 184, a batch normalization layer 186, and a leaky rectified linear activation function (Leaky ReLU) 188. Decoding blocks 192 comprise a transposed convolutional layer 194, a batch normalization layer 196, and a linear rectified activation function (ReLU) 198.

Each convolutional layer 184 of the prediction submodule 174 is supplied with pretrained weights, such as in the form of a 5×5 kernel and a vector of biases. Additionally, each block's batch normalization layer 186 is supplied with a vector for its scaling and offset factors.

Each encoder block's convolution output is fed to or concatenated with the result of the previous decoders transposed convolution output and fed to the next decoder block.

Training of the weights of the U-Net encoder/decoder CNN 174 for each signal component 150 is achieved by providing the encoder-decoder convolutional neural network 170 with predefined compositions and the separated stem signal components 150 associated therewith for the encoder-decoder convolutional neural network 170 to learn their characteristics. Training loss is a $L_1$-norm between masked input mix spectrum and source-target spectrums.

The U-Net encoder/decoder CNN 174 is used for generating a soft mask for each stem signal component 150 to be separated from the audio signal 122. Decomposition of the stem signal components 150 is then conducted by the signal post-processing submodule 176 from the magnitude spectrum 178 (also denoted the "source spectrum") using soft masking or multi-channel Wiener filtering. This approach is especially effective for extracting meaningful features from the audio signal 122.

For example, the U-Net encoder-decoder CNN 170 computes the complex spectrum of the audio signal 122 and its respective magnitude spectrum 178. More specifically, the U-Net encoder/decoder CNN 170 receives the magnitude spectrum 178 calculated in the signal preprocessing submodule 172 and calculates the prediction of the magnitude spectrum of the stem signal component 150 being separated.

Using the computed predictions (P), the magnitude spectrum (S), and the number (n) of stem signal components 150 being separated, a soft mask (Q) is computed as, $$Q = \frac{P^n}{S^n} \quad (1)$$

The signal post-processing submodule 176 then generates the stem signal components 150 by computing the inverse fast Fourier transform (IFFT) of the product of the soft mask and the complex spectrum. Each stem signal component 150 may comprise a L channel signal component and a R channel signal component As described above, the decomposed signal components (L, R, M, and stem signal components 144 to 150) are modified by the spectrum modification module 106 and time-delay module 108 for spectrum modification and adjustment of relative time delays. The spectrum and time-delay modified signal components 124 (which include spectrum and time-delay modified L, R, M, and stem signal components which are still denoted L, R, M, and stem signal components 144 to 150) are then sent to the psychoacoustical signal processing module 110 for introducing a psychoacoustic environment effect thereto (in other words, constructing the psychoacoustical effect of a desired environment) and forming a pair of output signals 130 (such as a L output signal and a R output signal).

The psychoacoustical signal processing module 110 comprises a plurality of modified psychoacoustical impulse response (MPIR) filters for generating a psychoacoustic environment corresponding to a specific real-world environment. Each MPIR filter corresponds to a modified version of an impulse response obtained from a real-world environment. Such an environment may be a so-called "typical" sound environment and may be selected based on various acoustic qualities thereof, such as reflections, loudness, and uniformity.

Figure 4:
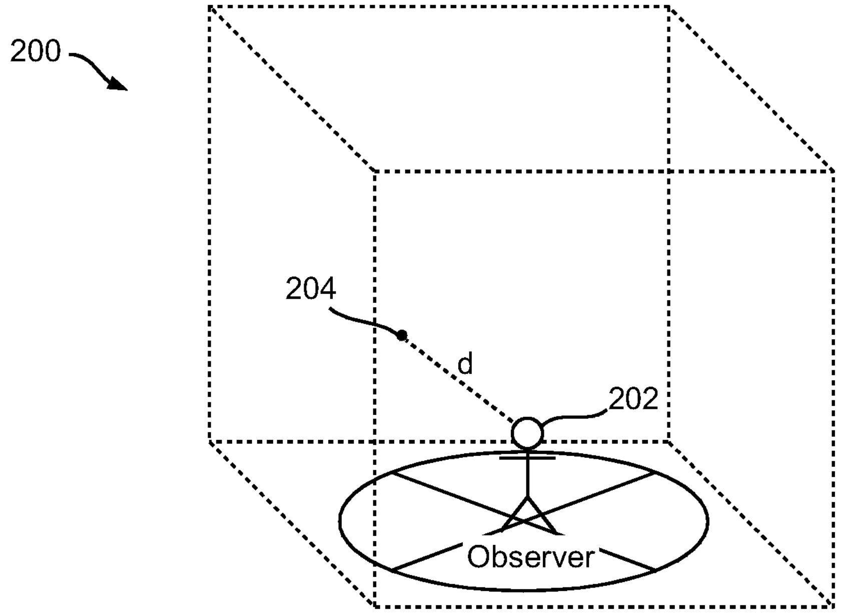
FIG. 4 is a schematic perspective view of a sound environment for obtaining impulse responses for constructing modified psychoacoustical impulse response (MPIR) filters of the audio system shown in FIG. 1.

In some embodiments, each impulse response is independently obtained in the corresponding real-world environment. FIG. 4 shows a real-world environment 200 with equipment established therein for obtaining the set of impulse responses.

As shown, a pair of audio-capturing devices 202 such as a pair of microphones spaced apart with a distance corresponding to the typical distance of human ears are set up at a three-dimensional (3D) position in the environment 200. A sound source (not shown) such as a speaker is positioned at a 3D position 204 at a distance to the pair of audio-capturing devices 202.

The sound source plays a predefined audio signal. The audio-capturing devices 202 captures the audio signal transmitted from the sound source within the full range of audible frequencies (20 Hz to 20,000 Hz) for obtaining a left-channel impulse response and a right-channel impulse response. Then, the sound source is moved to another 3D position for generating another pair of impulse responses. The process may be repeated until the impulse responses for all positions (or all "representative" positions) are obtained.

In various embodiments, the distance, angle, and height of the sound source at each 3D position 204 may be determined empirically, heuristically, or based on the acoustic characteristics of the environment 200 such that the impulse responses obtained based on the sound source at the 3D position 204 is "representative" of the environment 200. Moreover, those skilled in the art will appreciate that in some embodiments, a plurality of sound sources may be simultaneously set up at various positions. Each sound source generates a sound in sequence for the audio-capturing devices 202 to capture and obtain the impulse responses.

Each impulse response is converted to the discrete-time domain (for example, sampled and digitized) and may be modified. For example, in some embodiments, each impulse response may be truncated to a predefined length such as between 10,000 and 15,000 samples for filter-optimization purposes.

In some embodiments, an impulse response may be segmented into two components, including the direct impulse and decayed tail portion (that is, the portion after an edit point). The direct impulse contains the spectral coloring of the pinna, for a sound produced at a position in relation to the listener.

The length of the tail portion (equivalently, the position of the edit point in the impulse response) may be determined empirically, heuristically, or otherwise in a desired manner. The amplitude of the tail portion may be weighted by an amplification factor $\beta$ (that is increased if the amplification factor $\beta$ is greater than one, or decreased if the amplification factor $\beta$ is between zero and one, or unchanged if the amplification factor $\beta$ equals to one) for achieving the desired ambience for a particular type of sound, thereby allowing the audio system 100 to tailor room reflections away from the initial impulse response and creating a highly unique listening experience unlike that of non-modified impulse responses.

The value of the amplification factor $\beta$ represents the level of modification which may be designed to modify the information level of the initial impulse spike from the environmental reflections of interest (for example, depending on the signal content and the amount of reflection level desired for a given environment wherein multiple environments may have very different acoustic properties and require suitable balancing to achieve the desired outcome) and to increase the reflections contained in the impulse after the initial spike which generally contains positional information relative to the apparent location of a sound source relative to the head of the listener, when listening over headphones.

Spectrum modification and/or time-delay adjustment of the initial impulse response may be used (for example, dependent on the interaction of sound and the effect of the MPIR filters between the multiple environments) to accentuate a desirable elemental expansion prior to or after the initial impulse edit-point thereby further enhancing the listener's experience. This modification is achieved by selecting a time location (that is, the edit position) beyond the initial impulse response, and providing the amplification factor $\beta$. As described above, an amplification factor in the range of 0 to 1 is effectively a compression factor resulting in reduction of the distortion caused by reflections and other environmental factors, and wherein an amplification factor greater than one (1) allows amplification of the resulting audio.

Each modified impulse response is then used to determine the transfer function of a MPIR filter. As those skilled in the art understand, the transfer function determines the structure of the filter (for example, the coefficients thereof).

Thus, a plurality of left-channel MPIR filters and right-channel MPIR filters may be obtained each representing the acoustic propagation characteristics from the sound source at a position 204 of the 3D environment 200 to a user's left ear or right ear. MPIR filters of various 3D environments may be obtained as described above and stored in the storage 118 for use.

In some embodiments, MPIR filters within a capture environment may be grouped into pairs (for example, one corresponding to the left ear of a listener and another one corresponding to the right ear of the listener) where symmetry exists along the sagittal plane. MPIR-filter pairs share certain parameters within the filter configuration, such as assigned source signal, level, and phase parameters.

In some embodiments, all MPIR filters and MPIR-filter pairs captured within a given environment may be grouped into MPIR filter banks. Each MPIR filter bank comprises one or more MPIR-filter pairs with each MPIR-filter pair corresponding to a sound position of the 3D environment 200 such that the MPIR-filter pairs of the MPIR filter bank represent the sound propagation model from a first position to the left and right ears of a listener and (if the MPIR filter bank comprising more than one MPIR-filter pair) with reflections at one or more positions in the 3D environment 200. Each MPIR-filter pair of the MPIR bank is provided with a weighting factor. The environmental weighting factor allows control of the environment's unique auditory qualities in relation to the other environments in the final mix. This feature allows for highlighting environments suited for certain situations and diminishing those whose acoustic characteristics may conflict.

As will be described in more detail later, the MPIR filters containing complex first wave and multiple geometry based reflections generated by modified capture geometries may be cascaded and/or combined to provide the listener with improved listening experiences. In operation, each MPIR filter convolves with its input signal to "color" the spectrum thereof with both environmental qualities and effects of the listeners' pinnae. Thus, the result of cascading and/or combining the MPIR filters (in parallel and/or in series) may deliver highly complex interaural spectral differences due specifically to structural differences in the capture environments and pinnae of the two ears. This results in final psychoacoustically-correct MPIR filters for system sound processing.

In various embodiments, a MPIR filter may be implemented as a Modified Psychoacoustical Finite Impulse Response (MPFIR) filter, a Modified Psychoacoustical Infinite Impulse Response (MPIIR) filter, or the like.

Each MPIR filter may be associated with necessary information such as the corresponding sound-source location, the desired input signal type, the name of the corresponding environment, phase adjustments (if desired) such as phase-correction values, and/or the like. The MPIR filters captured from multiple acoustic environments are grouped by their assigned input signals (such as grouped by different types of sounds such as music, vocals, voice, engine sound, explosion, and the like; for example, a MPIR's assigned signal may be the left channel of the vocal separation track) to create Psychoacoustical Impulse Response Filter (PIRF) banks for generating the desired psychoacoustic environments which are tailored to the optimal listening conditions for the type of media being consumed, for example, music, movies, videos, augmented reality, games and/or the like.

FIGS. 5A to 5G are portions of a schematic diagram illustrating the detail of the psychoacoustical signal processing module 110. As shown, the psychoacoustical signal processing module 110 comprises a plurality of MPIR filter banks 242-1, 242-2, 242-3, 242-4(*k*), and 242-5(*k*), where k=1, . . . , K, for processing the L signal component, R signal component, M signal component, and the K stem signal components. Each MPIR filter bank 242 comprises one or more (for example, two) MPIR filter pairs $MPIR_{A1}$ and $MPIR_{B1}$ (for MPIR filter bank 242-1), $MPIR_{A2}$ and $MPIR_{B2}$ (for MPIR filter bank 242-2), $MPIR_{A3}$ and $MPIR_{B3}$ (for MPIR filter bank 242-3), $MPIR_{A4(k)}$ and $MPIR_{B4(k)}$ (for MPIR filter bank 242-4(*k*)), and $MPIR_{A5(k)}$ and $MPIR_{B5(k)}$ (for MPIR filter bank 242-5(*k*)). Each MPIR filter pair comprise a pair of MPIR filters ($MPIR_{AxL}$ and $MPIR_{AxR}$, where x representing the above described subscripts 1, 2, 3, 4(k), and 5(k)). The coefficients of the MPIR filters are stored in and obtained from the storage 118. Each signal component is processed by a MPIR filter bank $MPIR_{Ax}$ and $MPIR_{Bx}$.

Figure 5A:
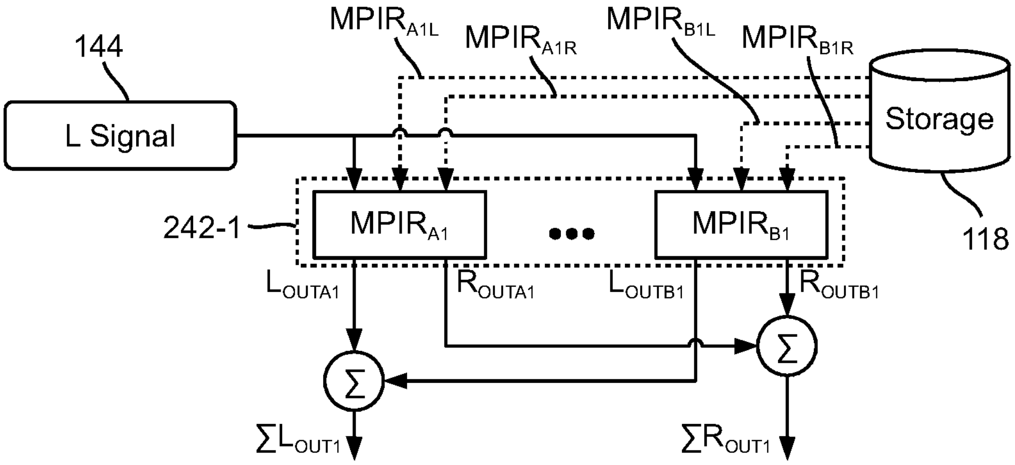
FIGS. 5A to 5G are portions of a schematic diagram showing the detail of a psychoacoustical signal processing module of the audio system shown in FIG. 1.
Figure 5B:
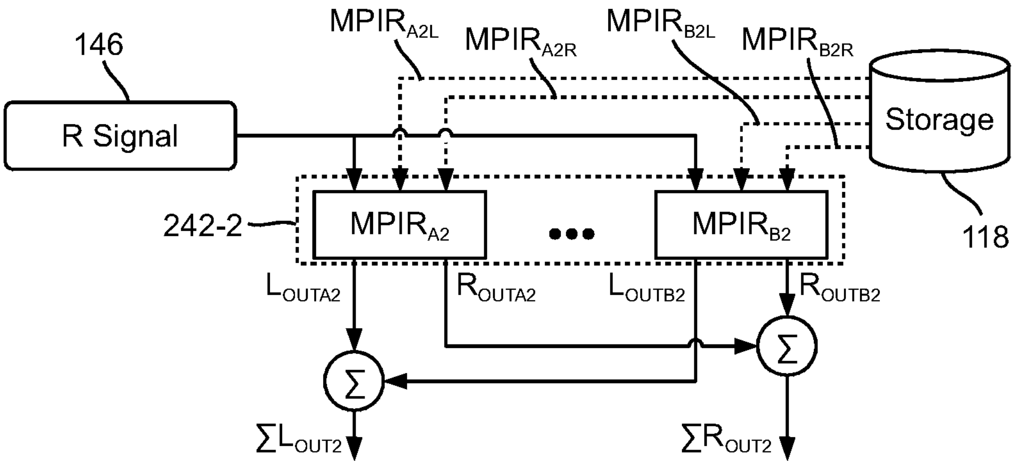
Figure 5C:
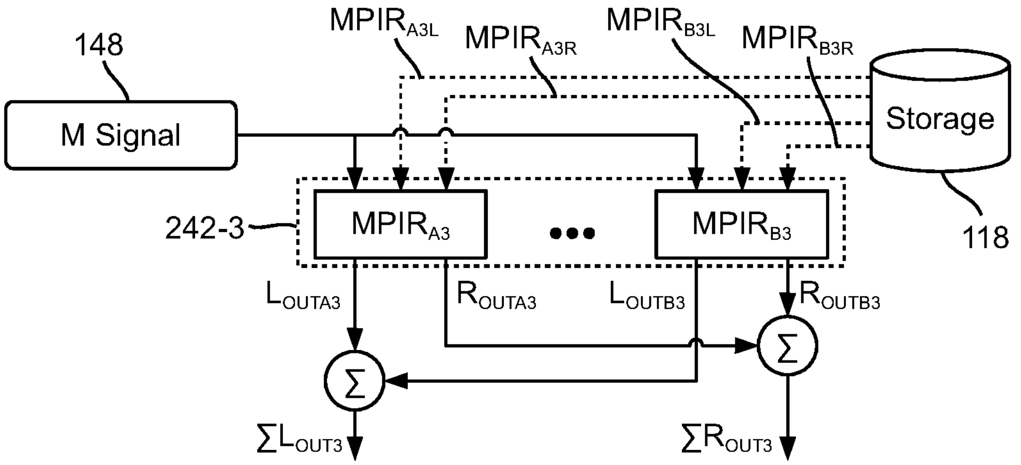
Figure 5D:
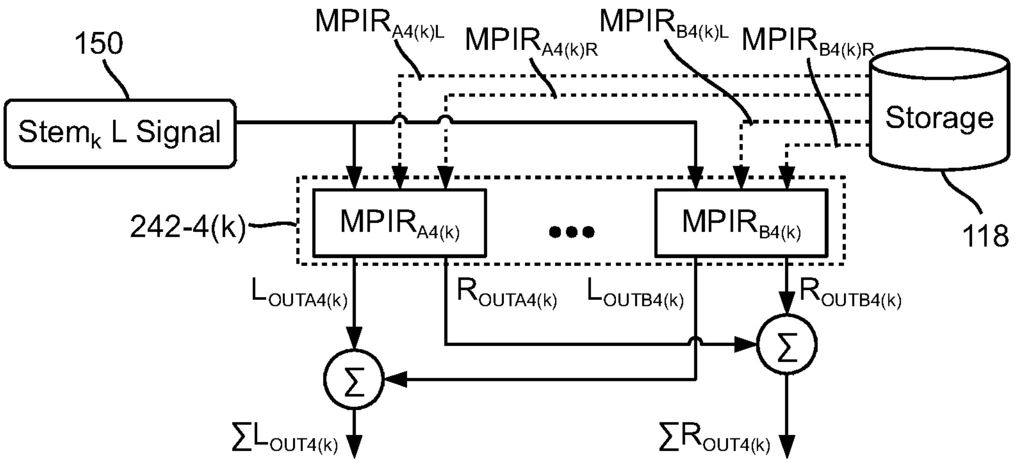
Figure 5E:
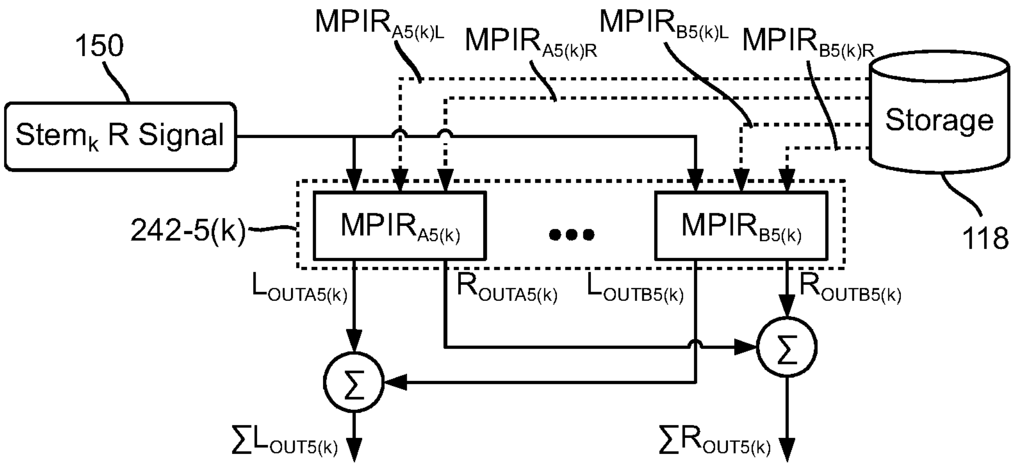

For example, as shown in FIG. 5A, the L signal component 144 is passed through a pair of MPIR filters $MPIR_{A1L}$ and $MPIR_{A1R}$ of the MPIR filter pair $MPIR_{A1}$ of the MPIR filter bank 242-1 which generate a pair of L and R filtered signals $L_{OUTA1}$ and $R_{OUTA1}$, respectively. The L signal component 144 is also passed through a pair of MPIR filters $MPIR_{B1L}$ and $MPIR_{B1R}$ of the MPIR filter pair $MPIR_{B1}$ of the MPIR filter bank 242-1 which generates a pair of L and R filtered signals $L_{OUTB1}$ and $R_{OUTB1}$, respectively. The L filtered signals generated by the two MPIR filter banks $MPIR_{A1}$ and $MPIR_{B1}$ are summed or otherwise combined to generate a combined L filtered signal $\Sigma L_{OUT1}$. Similarly, the R filtered signals generated by the two MPIR filter banks $MPIR_{A1}$ and $MPIR_{B1}$ are summed or otherwise combined to generate a combined R filtered signal $\Sigma R_{OUT1}$.

Figure 6:
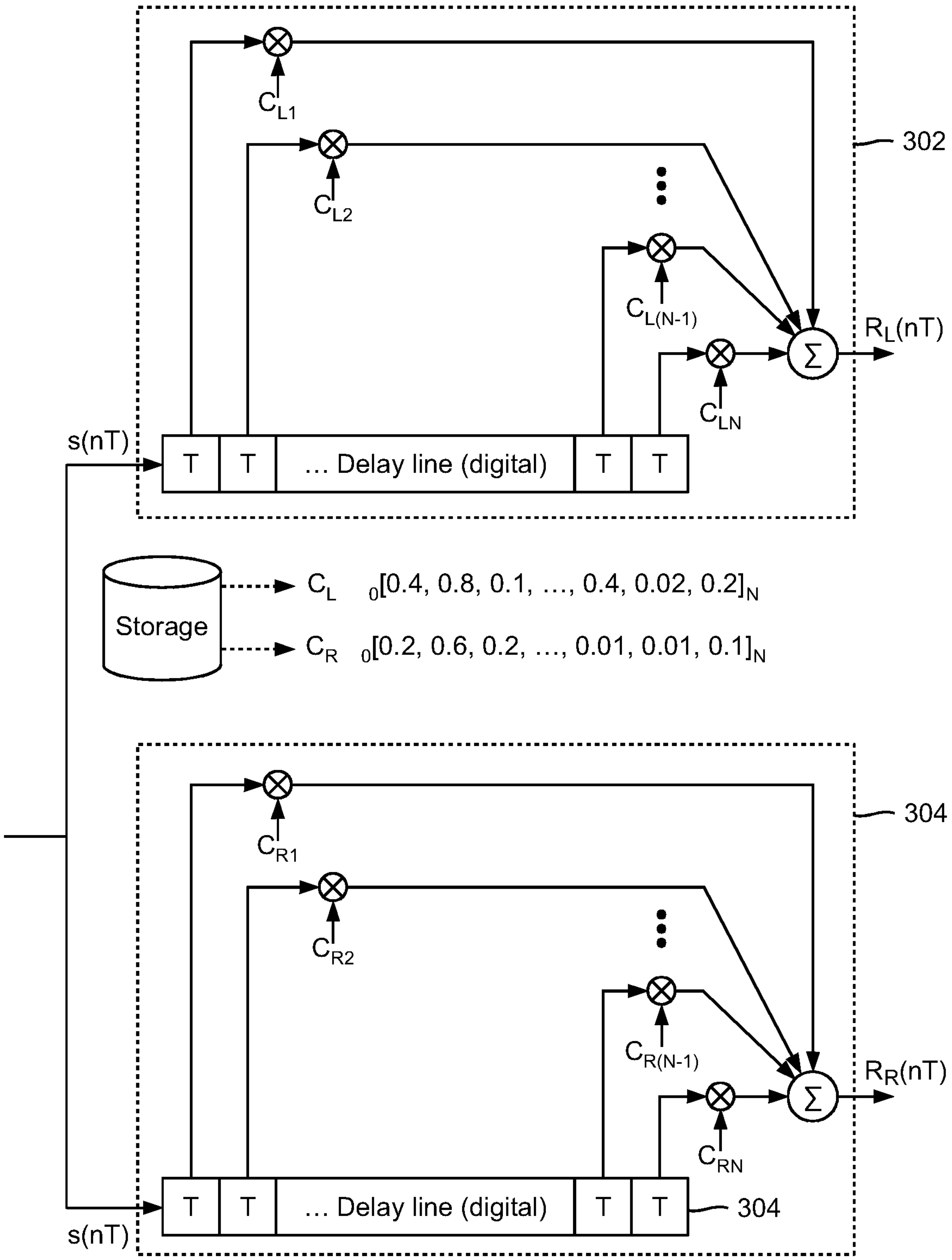
FIG. 6 is a schematic diagram showing the detail of the filters of the psychoacoustical signal processing module shown in FIG. 1.

As those skilled in the art will appreciate, when passing a signal through a MPIR filter, the signal is convolved with the MPIR-filter coefficients captured for the left or right ear. FIG. 6 is a schematic diagram showing a signal s(nT), T is the sampling period, passing through a MPIR filter bank having two MPIR filters 302 and 304. The coefficients $C_L=[C_{L1}, C_{L2}, \ldots, C_{LN}]$ and $C_R=[C_{R1}, C_{R2}, \ldots, C_{RN}]$ of the MPIR filters 302 and 304 are stored in the storage 118 and may be retrieved for processing the signal s(nT).

As shown in FIG. 6, when passing through each of the MPIR filters 302 and 304, the signal s(nT) is sequentially delayed by a time period T and weighted by a coefficient of the filter. All delayed and weighted versions of the signal s(nT) are then summed to generate the output $R_L(nT)$ or $R_R(nT)$. For example, when the input signal s(nT) is the L signal component 144 and the filters 302 and 304 are the MPIR filter of the MPIR filter bank $MPIR_{A1}$, the outputs $R_L(nT)$ or $R_R(nT)$ are respectively the L and R filtered signals $L_{OUTA1}$ and $R_{OUTA1}$.

The R, M, and the K stem signal components 146 to 150 are processed in similar manners and with the filter structure shown in FIG. 6, each passing through a pair of MPIR filter banks $MPIR_{A2}$ and $MPIR_{B2}$ (for R signal component 146), $MPIR_{A3}$ and $MPIR_{B3}$ (for M signal component 148), $MPIR_{A4(k)}$ and $MPIR_{B4(k)}$ (for the k-th L-channel stem signal component 150, where k=1, . . . , K), and $MPIR_{A5(k)}$ and $MPIR_{B5(k)}$ (for the k-th R-channel stem signal component 150, where k=1, . . . , K), and generate combined L filtered signals $\Sigma L_{OUT2}$, $\Sigma L_{OUT3}$, $\Sigma L_{OUT4(k)}$, and $\Sigma L_{OUT5(k)}$ and combined R filtered signals $\Sigma R_{OUT2}$, $\Sigma R_{OUT3}$, $\Sigma R_{OUT4(k)}$, and $\Sigma R_{OUT5(k)}$, as shown in FIGS. 5B to 5E.

Figure 5F:
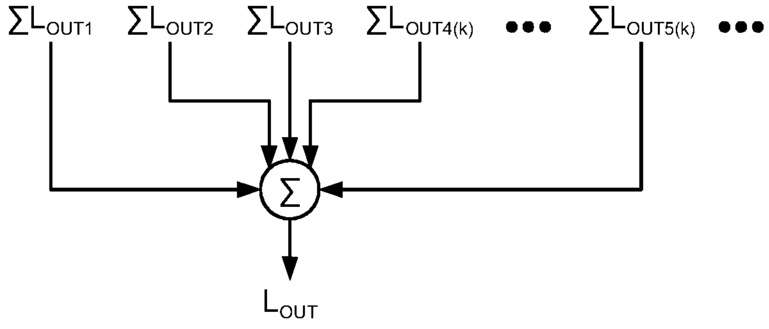
Figure 5G:
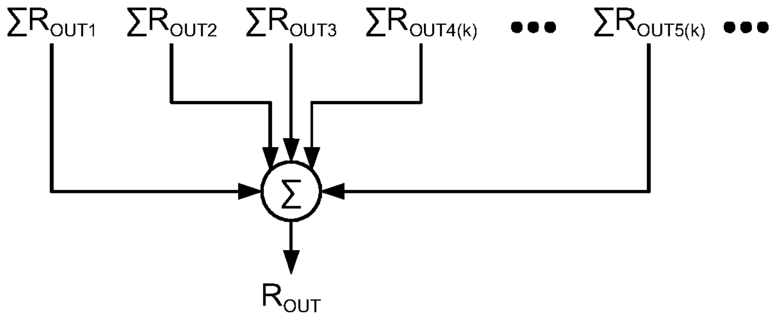

As shown in FIG. 5F, all combined L filtered signals $\Sigma L_{OUT1}$, $\Sigma L_{OUT2}$, $\Sigma L_{OUT3}$, $\Sigma L_{OUT4(k)}$, and $\Sigma L_{OUT5(k)}$ (where k=1, . . . , K) are summed or otherwise combined to generate a L output signal $L_{OUT}$. As shown in FIG. 5G, all combined R filtered signals $\Sigma R_{OUT1}$, $\Sigma R_{OUT2}$, $\Sigma R_{OUT3}$, $\Sigma R_{OUT4(k)}$, and $\Sigma R_{OUT5(k)}$ (where k=1, . . . , K) are summed or otherwise combined to generate a R output signal $R_{OUT}$. As described above, the L and R output signals form the output signal 130 of the psychoacoustical signal processing module 110 outputting to the D/A converter 112 which are then amplified by the amplification module 114 and output to the speakers of the speaker module 116 for sound generation.

In some embodiments, the speaker module 116 may be headphones. Those skilled in the art understand that the headphones in market may have different spectral characteristics and auditory qualities based on the type (in-ear or over ear), driver, driver position, and various other factors. To adapt to these differences, specific headphone configurations have been created that allow for the system to cater to these cases. Various parameters of the audio system 100 may be altered, such as custom equalization curves, selection of the psychoacoustical impulse responses, and the like. Headphone configurations are additionally set based on the context of the audio signal 122 such as audio signal of music, movies, and games whose contexts may have unique configurations for a selected headphone.

Bluetooth headphones as a personal-area-network device (PAN device) utilize Media Access Control (MAC) addresses. A MAC address of a device is unique to the device and is composed of a 12 character alphanumeric value which may be further segmented into six (6) octets. The first three octets of a MAC address form the organizationally unique identifier (OUI) assigned to device manufactures by the Institute of Electrical and Electronics Engineers (IEEE). The OUI may be utilized by the audio system 100 to identify the manufacturer of the headphone connected such that a user may be presented with a reduced set of options for headphone configuration selection. Selections are stored such that subsequent connections from the unique MAC address may be associated with the correct configurations.

In the case of wired headphones (which may be strictly analog devices), there is no bidirectional communication between the headphones and the end device they are connected with. However, in this situation the audio system 100 may notify that the output device has changed from the previous state. When this occurs the audio system 100 may prompt the user to identify what headphones are connected such that the proper configuration may be used for their specific headphones. User selections are stored for convenience and the last selected headphone configuration may be selected when the audio system 100 subsequently notifies that the headphone jack is in use.

The effect that is achieved in the audio system 100 is configured by the default configuration in any given headphone configuration. This effect however may be adjusted by the end user to achieve their preference on the level of the effect achieved. This effect is achieved through changing the relative mix of the MPIRs as defined in the configuration, giving more or less precedence to some environments which have a greater effect on the output.

IMPLEMENTATIONS

Embodiments described above provide a system, apparatus, and method for processing audio signals for playback over headphones in which psychoacoustically processed sounds appear to the listener to be emanating from a source located outside of the listener's head at a location in the space surrounding thereabout, and in some cases, in combination with sounds within the head as desired.

In some embodiments, the modules 104 to 118 of the audio system 100 may be implemented in a single device such as a headset. In some other embodiments, the modules 104 to 118 may be implemented in separated but functionally connected devices. For example, in one embodiment, the modules 104 to 112 and the module 118 may be implemented as a single device such as a media player or as a component of another device such as a gaming device, and the modules 114 and 116 may be implemented as separate device such as a headphone functionally connected to the media player or the gaming device.

Those skilled in the art will appreciate that, the audio system 100 may be implemented using any suitable technologies. For example, in some embodiments, some or all modules 104 to 114 of the audio system 100 may be implemented using one more circuits having separate electrical components or one or more integrated circuits (ICs) such as one or more digital signal processing (DSP) chips, one or more field-programmable gate array (FPGA), one or more application-specific integrated circuit (ASIC), and/or the like.

In some other embodiments, the audio system 100 may be implemented using one or more microcontrollers, one or more microprocessors, one or more system-on-a-chip (SoC) structures, and/or the like, with necessary circuits for implementing the functions of some or all modules 104 to 116. In still some other embodiments, the audio system 100 may be implemented using a computing device such as a general-purpose computer, a smartphone, a tablet, or the like, wherein some or all modules 104 to 110 are implemented as one or more software programs or program modules, or firmware programs or program modules. The software/firmware programs or program modules may be stored in one or more non-transitory storage media such as the storage 118 such that one or more processors of the computing device may read and execute the software/firmware programs or program modules for performing the functions of the modules 104 to 110.

In some embodiments, the storage 118 may be any suitable non-transitional storage device such as one or more random-access memories (RAMs), hard drives, solid-state memories, and/or the like.

In some embodiments, the system, apparatus, and method disclosed herein process the audio signals in real-time for playback the processed audio signals over headphones.

In some embodiments, at least a subset of the MPIR filters may be configured to operate in parallel for facilitate the real-time signal processing of the audio signals. For example, the MPIR filters may be implemented as a plurality of filter circuits operating in parallel for facilitate the real-time signal processing of the audio signals. Alternatively, the MPIR filters may be implemented as software/firmware programs or program modules that may be executed in parallel by a plurality of processor cores for facilitate the real-time signal processing of the audio signals.

In some embodiments, the relative time delay of the output of each MPIR filter ($L_{OUTAx}$ or $L_{OUTBx}$) may be further adjusted or modified to emphasize the most desirable overall psychoacoustic values in the chain.

In some embodiments, the MPIR filters (or more specifically the coefficients thereof) may be configured to change the perceived location of the audio signal 122.

In some embodiments, the MPIR filters (or more specifically the coefficients thereof) may be configured to alter the perceived ambience of the audio signal 122.

In some embodiments, the MPIR filters (or more specifically the coefficients thereof) may be configured to alter the perceived dynamic range of the audio signal 122.

In some embodiments, the MPIR filters (or more specifically the coefficients thereof) may be configured to alter the perceived spectral emphasis of the audio signal 122.

In some embodiments, the signal decomposition module 104 may not generate the mono signal component 148.

In some embodiments, the audio system 100 may not comprise the speaker module 116. Rather, the audio system 100 may modulate the output of the D/A converter module 112 to a carrier signal and amplify the modulated carrier signal by using the amplifier module 114 for broadcasting.

In some embodiments, the audio system 100 may not comprise the D/A converter module 112, the amplifier module 114, and the speaker module 116. Rather, the audio system 100 may store the output of the psychoacoustical signal processing module 110 in the storage 118 for future playing.

In some embodiments, the audio system 100 may not comprise the spectrum modification module 106 and/or the time-delay module 108.

In some embodiments, the system, apparatus, and method disclosed herein separate an input signal into a set of one or more pre-defined distinct signals or features by using a pre-trained U-Net encoder/decoder CNN 174 which defines a set of auditory elements with various natures or characteristics (for example, various instruments, sources, or the like) that may be identified from the input signal.

In some embodiments, the system, apparatus, and method disclosed herein may use another system for creation and training of the U-Net encoder/decoder CNN 174 to identify the set of auditory elements, for use in a soft mask prediction process.

In some embodiments, the system, apparatus, and method disclosed herein may use conventional stereo files in combination with the insertion of discrete sounds to be positioned where applicable for music, movies, video files, video games, communication systems and augmented reality.

In some embodiments, the system, apparatus, and method disclosed herein may provide apparatus for reproducing audio signals over headphones in which the apparent location of the source of the audio signals is located outside of the listener's head and in which that apparent location may be made to move in relation to the listener by adjusting the parameters of the MPIR filters or by passing the input signal or some discrete features thereof through different MPIR filters.

In some embodiments, the system, apparatus, and method disclosed herein may provide an apparent or virtual sound location outside of the listener's head as well as panning through the inside the user's head. Moreover, the apparent sound source may be made to move, preferably at the instigation of the user.

In some embodiments, the system, apparatus, and method disclosed herein may provide apparatus for reproducing audio signals over headphones in which the apparent location of the source of the audio signals is located outside and inside of the listener's head in a combination for enhancing the listening experience and in which apparent sound locations may be made to move in relation to the listener.

In some embodiments, the listener may "move" the apparent location of the audio signals by operation of the device, for example, via a user control interface.

In some embodiments, the system, apparatus, and method disclosed herein may process an audio sound signal to produce two signals for playback over the left and right transducers of a listeners headphone, and in which the stereo input signal is provided with directional information so that the apparent source of the left and right signals are located independently on a sphere surrounding the outside of the listener's head including control over perceived distance of sounds from the listener.

In some embodiments, the system, apparatus, and method disclosed herein may provide a signal processing function that may be selected to deal with different signal waveforms as might be present at an ear of a listener positioned at various locations in a given environment.

In some embodiments, the system, apparatus, and method disclosed herein may be used as part of media production to process conventional stereo signals in combination with discrete mono signal sources in positional locations to create a desirable entertainment experience.

In some embodiments, the system and apparatus disclosed herein may comprise consumer devices such as smart phones, tablets, smart TVs, game platforms, personal computers, wearable devices, and/or the like, and the method disclosed herein may be executed on these consumer devices.

In some embodiments, the system, apparatus, and method disclosed herein may be used to process conventional stereo signals in various media materials such as movies, music video games, augmented reality, communications and the like to provide improved audio experiences.

In some embodiments, the system, apparatus, and method disclosed herein may be implemented in a cloud-computing environment and run with minimum latency on wireless communication networks (for example, WI-FI® networks (WI-FI is a registered trademark of Wi-Fi Alliance, Austin, TX, USA), wireless broadband communication networks, and/or the like) for various applications.

In above embodiments, each of the decomposed signal components 124 output from the signal decomposition module 104 is first processed by the spectrum modification module 106 and then by the time-delay module 108 for spectrum modification and time-delay adjustment. In some alternative embodiments, each of the decomposed signal components 124 output from the signal decomposition module 104 is first processed by the time-delay module 108 and then by the spectrum modification module 106 for spectrum modification and time-delay adjustment.

In some alternative embodiments, the audio system 100 may be configurable by a user (for example, via using a switch) to bypass or engage (or otherwise disable and enable) the psychoacoustical signal processing module 110.

Although embodiments have been described above with reference to the accompanying drawings, those of skill in the art will appreciate that variations and modifications may be made without departing from the scope thereof as defined by the appended claims.

What is claimed is:

1. A sound-processing apparatus for processing a sound-bearing signal, the apparatus comprising:
- a signal decomposition module for separating the sound-bearing signal into a plurality of signal components, the plurality of signal components comprising a left signal component, a right signal component, and a plurality of perceptual feature components; and
- a psychoacoustical signal processing module comprising a plurality of psychoacoustic filters for:
  - filtering each of the plurality of signal components by at least a pair of the plurality of psychoacoustic filters into a left (L) filtered signal and a right (R) filtered signal, thereby forming a group of L filtered signals and a group of R filtered signals, and
  - outputting a combination of the group of L filtered signals as a left output signal and a combination of the group of R filtered signals as a right output signal.

2. The sound-processing apparatus of claim 1, wherein the plurality of psychoacoustic filters are grouped into a plurality of filter banks;
- wherein each filter bank comprises one or more of the pairs of the plurality of psychoacoustic filters; and wherein each of the plurality of filter banks is configured for receiving a respective one of the plurality of signal components for passing through the psychoacoustic filters thereof and generating a subset of the group of L filtered signals and a subset of the group of R filtered signals.

3. The sound-processing apparatus of claim 1, wherein the plurality of perceptual feature components comprise a plurality of discrete feature components determined based on non-directional and non-frequency sound characteristics.

4. The sound-processing apparatus of claim 1, wherein the signal decomposition module comprises a prediction submodule, the prediction submodule comprising or configured to use a neural network for generating the plurality of perceptual feature components from the sound-bearing signal.

5. The sound-processing apparatus of claim 4, wherein the neural network comprises an encoder-decoder convolutional neural network or a U-Net encoder/decoder convolutional neural network.

6. The sound-processing apparatus of claim 1, wherein the signal decomposition module is configured for separating the plurality of perceptual feature components from the sound-bearing signal using a plurality of time-frequency masks or using spectral filtering.

7. The sound-processing apparatus of claim 6, wherein the signal decomposition module comprises a prediction submodule, a signal preprocess submodule, and a signal post-processing submodule;

wherein the signal preprocess submodule is configured for calculating a short-time Fourier transform (STFT) of the sound-bearing signal as a complex spectrum (CS) thereof for the prediction submodule to generate the plurality of perceptual feature components;

wherein the prediction submodule is configured for generating the plurality of time-frequency masks; and wherein the signal post-processing submodule is configured for generating the plurality of perceptual feature components by computing the inverse fast Fourier transform (IFFT) of the product of the corresponding one of the plurality of time-frequency masks and the CS of the sound-bearing signal.

8. The sound-processing apparatus of claim 1, wherein the plurality of psychoacoustic filters are configured for changing at least one of a perceived location of the sound-bearing signal, a perceived ambience of the sound-bearing signal, a perceived dynamic range of the sound-bearing signal, and a perceived spectral emphasis of the sound-bearing signal.

9. A method for processing a sound-bearing signal, the method comprising:

separating the sound-bearing signal into a plurality of signal components comprising a left signal component, a right signal component, and a plurality of perceptual feature components;

using at least a pair of psychoacoustic filters to filter each of the plurality of signal components into a left (L) filtered signal and a right (R) filtered signal, thereby forming a group of L filtered signals and a group of R filtered signals; and outputting a combination of the group of L filtered signals as a left output signal and a combination of the group of R filtered signals as a right output signal.

10. The method of claim 9, wherein said using at least the pair of psychoacoustic filters to filter each of the plurality of signal components into the L filtered signal and the R filtered signal comprising:

passing each of the plurality of signal components through a first subset of at least the pair of the plurality of psychoacoustic filters in parallel for generating a subset of the group of L filtered signals; and passing each of the plurality of signal components through a second subset of at least the pair of the plurality of psychoacoustic filters in parallel for generating a subset of the group of R filtered signals.

11. The method of claim 9, wherein the plurality of perceptual feature components comprise a plurality of discrete feature components determined based on non-directional and non-frequency sound characteristics.

12. The method of claim 9, wherein said separating the sound-bearing signal comprises:

using a neural network for generating the plurality of perceptual feature components from the sound-bearing signal.

13. The method of claim 12, wherein the neural network comprises an encoder-decoder convolutional neural network or a U-Net encoder/decoder convolutional neural network.

14. The method of claim 9, wherein the signal decomposition module is configured for separating the plurality of perceptual feature components from the sound-bearing signal using a plurality of time-frequency masks or using spectral filtering.

15. One or more non-transitory computer-readable storage devices comprising computer-executable instructions for processing a sound-bearing signal, wherein the instructions, when executed, cause a processing structure to perform actions comprising:

separating the sound-bearing signal into a plurality of signal components comprising a left signal component, a right signal component, and a plurality of perceptual feature components;

using at least a pair of psychoacoustic filters to filter each of the plurality of signal components into a left (L) filtered signal and a right (R) filtered signal, thereby forming a group of L filtered signals and a group of R filtered signals; and outputting a combination of the group of L filtered signals as a left output signal and a combination of the group of R filtered signals as a right output signal.

16. The one or more non-transitory computer-readable storage devices of claim 15, wherein said using at least the pair of psychoacoustic filters to filter each of the plurality of signal components into the L filtered signal and the R filtered signal comprises:

passing each of the plurality of signal components through a first subset of at least the pair of the plurality of psychoacoustic filters in parallel for generating a subset of the group of L filtered signals; and passing each of the plurality of signal components through a second subset of at least the pair of the plurality of psychoacoustic filters in parallel for generating a subset of the group of R filtered signals.

17. The one or more non-transitory computer-readable storage devices of claim 15, wherein the plurality of perceptual feature components comprise a plurality of discrete feature components determined based on non-directional and non-frequency sound characteristics.

18. The one or more non-transitory computer-readable storage devices of claim 15, wherein said separating the sound-bearing signal comprises:

using a neural network for generating the plurality of perceptual feature components from the sound-bearing signal.

19. The one or more non-transitory computer-readable storage devices of claim 18, wherein the neural network comprises an encoder-decoder convolutional neural network or a U-Net encoder/decoder convolutional neural network.

20. The one or more non-transitory computer-readable storage devices of claim 15, wherein said separating the sound-bearing signal comprises:

separating the plurality of perceptual feature components from the sound-bearing signal using a plurality of time-frequency masks or using spectral filtering.

21. The one or more non-transitory computer-readable storage devices of claim 20, wherein said separating the sound-bearing signal comprises:

calculating a short-time Fourier transform (STFT) of the sound-bearing signal as a complex spectrum (CS) thereof;

generating the plurality of time-frequency masks; and generating the plurality of perceptual feature components by computing the inverse fast Fourier transform (IFFT) of the product of the corresponding one of the plurality of time-frequency masks and the CS of the sound-bearing signal.

22. The one or more non-transitory computer-readable storage devices of claim 15, wherein said using the plurality of psychoacoustic filters to filter the plurality of signal components comprises:

using the plurality of psychoacoustic filters for changing at least one of a perceived location of the sound-bearing signal, a perceived ambience of the sound-bearing signal, a perceived dynamic range of the sound-bearing signal, and a perceived spectral emphasis of the sound-bearing signal.

* * * * *